United States Patent
Ishikawa

(10) Patent No.: US 8,470,485 B2
(45) Date of Patent: Jun. 25, 2013

(54) FUEL CELL SYSTEM

(75) Inventor: Norimasa Ishikawa, Asahikawa (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 180 days.

(21) Appl. No.: 12/743,506

(22) PCT Filed: Oct. 29, 2008

(86) PCT No.: PCT/JP2008/069599
§ 371 (c)(1),
(2), (4) Date: May 18, 2010

(87) PCT Pub. No.: WO2009/066549
PCT Pub. Date: May 28, 2009

(65) Prior Publication Data
US 2010/0248062 A1    Sep. 30, 2010

(30) Foreign Application Priority Data
Nov. 19, 2007  (JP) .................... 2007-299416

(51) Int. Cl.
*H01M 8/04* (2006.01)
(52) U.S. Cl.
USPC ............ 429/444; 429/428; 429/443; 429/446
(58) Field of Classification Search
None
See application file for complete search history.

(56) References Cited

U.S. PATENT DOCUMENTS
2009/0029226 A1* 1/2009 Yamagishi et al. ............. 429/34
2010/0098980 A1* 4/2010 Ishikawa .......................... 429/25

FOREIGN PATENT DOCUMENTS
| JP | 2005-228491 A | 8/2005 |
| JP | 2006-331884 A | 12/2006 |
| JP | 2007-165183 A | 6/2007 |
| JP | 2007-165237 A | 6/2007 |
| JP | 2007-273227 A | 10/2007 |
| WO | WO 2007072662 | * 6/2007 |

* cited by examiner

*Primary Examiner* — Barbara Gilliam
*Assistant Examiner* — Adam A Arciero
(74) *Attorney, Agent, or Firm* — Kenyon & Kenyon LLP

(57) ABSTRACT

A fuel cell system having an on-off valve, such as an injector, disposed in a fuel supply flow path restrains a pressure detection error of a fuel gas in the vicinity of the on-off valve to a small level. The fuel cell system includes a fuel cell, a fuel supply flow path for supplying a fuel gas, which is supplied from a fuel supply source, to the fuel cell, an on-off valve which adjusts the condition of a gas on an upstream side of the fuel supply flow path and then supplies the gas to a downstream side, and a control means which controls the drive of the on-off valve at a predetermined drive cycle, wherein the control means sets the upper limit value of a duty ratio at each drive cycle of the on-off valve.

4 Claims, 5 Drawing Sheets

$$T_S = T_V + T_D$$

$$T_{OFF} = T_S + T_F$$

$$R_U = \frac{T_{ON}}{T} = \frac{T_{ON}}{T_{ON} + T_{OFF}}$$

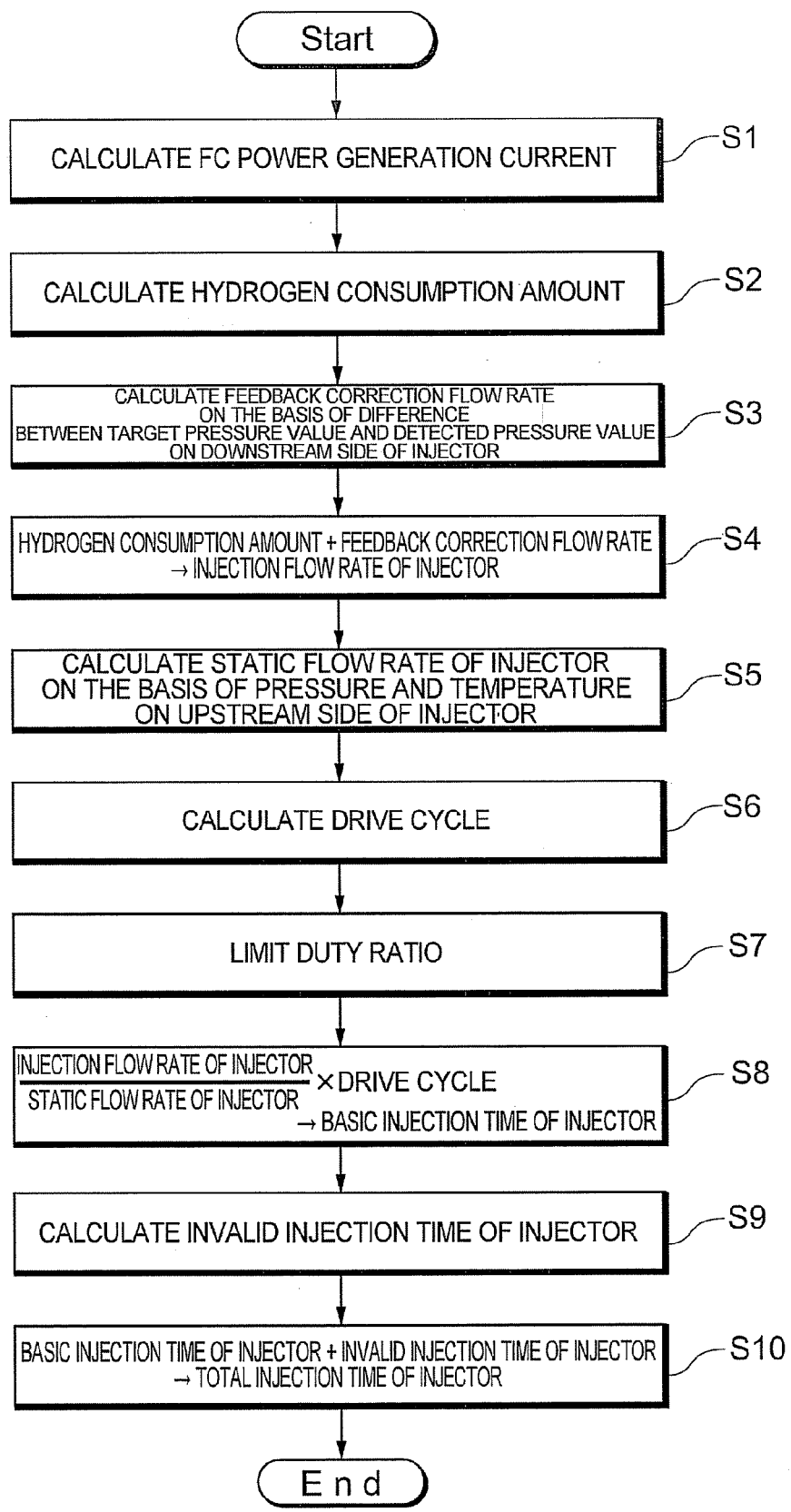

FUEL CELL SYSTEM

This is a 371 national phase application of PCT/JP2008/069599 filed 29 Oct. 2008, which claims priority to Japanese Patent Application No. 2007-299416 filed 19 Nov. 2007, the contents of which are incorporated herein by reference.

TECHNICAL FIELD

The present invention relates to a fuel cell system.

Hitherto, a fuel cell system having a fuel cell which generates electric power by receiving supplied reactant gases (a fuel gas and an oxidizing gas) has been proposed and placed in practical use. Currently, there has been proposed a technique in which an electromagnetic on-off valve, such as an injector, is disposed in a fuel supply flow path of a fuel cell system, and the operating condition of the on-off valve is controlled to adjust the pressure of a fuel gas in the fuel supply flow path.

In the conventional fuel cell system having such an injector, the pressure of a fuel gas on the downstream side (or the upstream side) of the injector in the fuel supply flow path is detected, and the feedback control of the injector and the detection of an anomaly in piping are carried out on the basis of the detected pressure (refer to, for example, patent document 1).

Patent document 1: Japanese Patent Application Laid-Open No. 2007-165237

DISCLOSURE OF INVENTION

Problems to be Solved by the Invention

However, in the conventional fuel cell system described in the above patent document 1, in the case where the non-injection time (valve closure time) of the injector is extremely short, the pressure detection error of the fuel gas in the vicinity of the upstream side or in the vicinity of the downstream side of the injector has been large due to an influence of a gas pressure vibration or the like at the time of the valve closure. A large pressure detection error of the fuel gas in the vicinity of the injector mentioned above may lead to a deteriorated accuracy of the feedback control of the injector or the detection of an anomaly.

The present invention has been made with the view of the circumstance described above and it is an object thereof to minimize the pressure detection error of a fuel gas in the vicinity of an on-off valve in a fuel cell system having an on-off valve, such as an injector, disposed in a fuel supply flow path.

Means for Solving the Problems

To fulfill the aforesaid object, a fuel cell system in accordance with the present invention is a fuel cell system which includes a fuel cell; a fuel supply flow path for supplying a fuel gas, which is supplied from a fuel supply source, to the fuel cell; an on-off valve which adjusts the condition of a gas on an upstream side of the fuel supply flow path and supplies the gas to a downstream side; and a control means which controls the drive of the on-off valve at a predetermined drive cycle, wherein the control means sets an upper limit value of a duty ratio at each drive cycle of the on-off valve.

Adopting the aforesaid arrangement makes it possible to set the upper limit value of a duty ratio at each drive cycle (the ratio of a valve open time at each drive cycle) of the on-off valve (in other words, to forcibly secure predetermined valve closure time at each drive cycle of the on-off valve). This makes it possible, therefore, to minimize a pressure detection error of the fuel gas caused by an extremely short valve closure time of the on-off valve. Hence, the accuracy of various types of control (e.g., the feedback control of the on-off valve) based on a fuel gas pressure detection result can be improved. Incidentally, the term "the condition of a gas" means the condition of a gas indicated in terms of a flow rate, a pressure, a temperature, a mol concentration and the like, and especially includes at least one of a gas flow rate and a gas pressure.

The fuel cell system may be provided with a pressure sensor for detecting the pressure value of the fuel gas on the downstream side of the on-off valve of the fuel supply flow path. In this case, a control means may be adopted to set the upper limit value of a duty ratio on the basis of the pressure recover time required from the point of a valve close command of the on-off valve to the point at which a detected pressure value on the pressure sensor is reset.

Further, the fuel cell system may adopt a control means which sets the upper limit value of the duty ratio such that the difference between a detected pressure value on the pressure sensor when the on-off valve is in operation and a target pressure value becomes a predetermined value or less.

Further, the fuel cell system may adopt a control means which implements the pressure detection of the fuel gas by the pressure sensor after predetermined time elapses from the instant the on-off valve is closed.

Further, the fuel cell system may adopt an injector as the on-off valve.

The injector is an electromagnetically driven on-off valve capable of adjusting the gas condition (the gas flow rate and the gas pressure) by directly driving a valve element with an electromagnetic drive force at a predetermined drive cycle to move the valve element away from a valve seat. A predetermined control unit drives the valve element of the injector to control the injection timing and the injection time of the fuel gas, thereby permitting highly accurate control of the flow rate and pressure of the fuel gas.

EFFECT OF THE INVENTION

According to the present invention, it is possible to minimize the pressure detection error of a fuel gas in the vicinity of an on-off valve in a fuel cell system having the on-off valve, such as an injector, disposed in a fuel supply flow path.

BEST MODE FOR CARRYING OUT THE INVENTION

The following will describe a fuel cell system 1 according to an embodiment of the present invention with reference to the accompanying drawings. The present embodiment will describe an example in which the present invention is applied to an in-vehicle power generating system of a fuel cell vehicle.

First, referring to FIG. 1 through FIG. 4, the construction of the fuel cell system 1 according to the embodiment of the present invention will be described.

As illustrated in FIG. 1, the fuel cell system 1 according to the present embodiment has a fuel cell 10 which receives supplied reactant gases (an oxidizing gas and a fuel gas) and generates electric power, and also includes mainly an oxidizing gas piping system 2 which supplies air as the oxidizing gas to the fuel cell 10, a hydrogen gas piping system 3 which supplies a hydrogen gas as the fuel gas to the fuel cell 10, and a controller 4 which integrally controls the entire system.

The fuel cell 10 has a stack structure composed of a predetermined number of stacked electric cells which receive supplied reactant gases to generate electric power. The electric power generated by the fuel cell 10 is supplied to a PCU (Power Control Unit) 11. The PCU 11 has an inverter and a DC-DC converter and the like disposed between the fuel cell 10 and a traction motor 12. A current sensor 13 for detecting current during power generation is installed to the fuel cell 10.

The oxidizing gas piping system 2 has an air supply flow path 21 which supplies an oxidizing gas (air) humidified by a humidifier 20 to the fuel cell 10, an air exhaust flow path 22 for leading an oxidizing off-gas exhausted from the fuel cell 10 to the humidifier 20, and an exhaust flow path 23 for leading the oxidizing off-gas from the humidifier 20 to the outside. The air supply flow path 21 is provided with a compressor 24 which captures the oxidizing gas in the air and pressure-feeds the captured oxidizing gas to the humidifier 20.

The hydrogen gas piping system 3 has a hydrogen tank 30 serving as a fuel supply source which stores a hydrogen gas of a high pressure (e.g., 70 MPa), a hydrogen supply flow path 31 serving as a fuel supply flow path for supplying the hydrogen gas from the hydrogen tank 30 to the fuel cell 10, and a circulation flow path 32 for returning the hydrogen off-gas exhausted from the fuel cell 10 to the hydrogen supply flow path 31. In place of the hydrogen tank 30, a reformer which generates a hydrogen-rich reformed gas from a hydrocarbon-based fuel and a high-pressure gas tank for storing the reformed gas, which has been generated by the reformer, in a high pressure state may be adopted as the fuel supply source. Alternatively, a tank having a hydrogen occluded alloy may be adopted as the fuel supply source.

The hydrogen supply flow path 31 includes a shutoff valve 33 which cuts off or permits the supply of the hydrogen gas from the hydrogen tank 30, a regulator 34 which adjusts the pressure of the hydrogen gas, and an injector 35. A primary pressure sensor 41 and a temperature sensor 42 are provided on the upstream side of the injector 35. The primary pressure sensor 41 detects the pressure value of the hydrogen gas in the hydrogen supply flow path 31, and the temperature sensor 42 detects the temperature of the hydrogen gas in the hydrogen supply flow path 31. A secondary pressure sensor 43 which detects the pressure value of the hydrogen gas in the hydrogen supply flow path 31 is provided on the downstream side of the injector 35 but on the upstream side of the merging portion of the hydrogen supply flow path 31 and the circulation flow path 32.

The regulator 34 is a device which regulates the upstream-side pressure (the primary pressure) to a preset secondary pressure. In the present embodiment, a mechanical pressure reducing valve which reduces the primary pressure is adopted as the regulator 34. The mechanical pressure reducing valve may adopt a publicly known construction which includes an enclosure in which a backpressure chamber and a pressure regulating chamber are formed with a diaphragm provided therebetween, and the primary pressure is reduced to a predetermined pressure in the pressure regulating chamber by the backpressure in the backpressure chamber so as to obtain the secondary pressure. In the present embodiment, the pressure on the upstream side of the injector 35 can be effectively reduced by disposing two regulators 34 on the upstream side of the injector 35, as illustrated in FIG. 1. This makes it possible to enhance the design freedom of the mechanical structure of the injector 35 (the valve element, the enclosure, the flow paths, a drive unit, and the like). Further, since the pressure on the upstream side of the injector 35 can be reduced, it is possible to restrain unsmooth movement of the valve element of the injector 35 due to an increased difference between the upstream-side pressure and the downstream-side pressure of the injector 35. Thus, the variable pressure regulation range of the downstream-side pressure of the injector 35 can be expanded and the deterioration in the responsiveness of the injector 35 can be restrained.

The injector 35 is an electromagnetically driven on-off valve capable of adjusting a gas flow rate and a gas pressure by directly driving the valve element with an electromagnetic drive force at a predetermined drive cycle to move the valve element away from the valve seat. The injector 35 has a valve seat with an injection hole through which a gaseous fuel, such as a hydrogen gas, is sprayed, a nozzle body which guides the supplied gaseous fuel to the injection hole, and a valve element which is movably accommodated and retained in the axial direction relative to the nozzle body (in the direction in which a gas flows) and which opens/closes the injection hole. The valve element of the injector 35 is driven by, for example, a solenoid, and the opening area of the injection hole can be switched in two steps or multiple steps by turning on/off a pulsed excitation current supplied to the solenoid. The gas injection time and the gas injection timing of the injector 35 are controlled by control signals output from the controller 4 thereby to control the flow rate and the pressure of the hydrogen gas with high accuracy. The injector 35 is adapted to directly drive the valve (the valve element and the valve seat) by an electromagnetic drive force to open/close the valve and the drive cycle can be controlled to a high-response range, thus exhibiting high responsiveness.

In the present embodiment, the injector 35 is disposed on the upstream side from a merging portion A1 of the hydrogen supply flow path 31 and the circulation flow path 32, as illustrated in FIG. 1. In the case where a plurality of hydrogen tanks 30 is adopted as fuel supply sources, the injector 35 is disposed on the downstream side from the portion where the hydrogen gases supplied from the individual hydrogen tanks 30 merge (a hydrogen gas merging portion A2), as indicated by the dashed lines in FIG. 1.

A discharge flow path 38 is connected to the circulation flow path 32 through a gas-liquid separator 36 and an exhaust drain valve 37. The gas-liquid separator 36 recovers moisture from the hydrogen off-gas. The exhaust drain valve 37 is actuated by a command from the controller 4 to discharge (purge) the moisture recovered by the gas-liquid separator 36 and the hydrogen off-gas containing impurities in the circulation flow path 32 to the outside. The circulation flow path 32 is provided with a hydrogen pump 39 which pressurizes the hydrogen off-gas in the circulation flow path 32 and feeds the pressurized hydrogen off-gas toward the hydrogen supply flow path 31. The hydrogen off-gas exhausted through the exhaust drain valve 37 and the discharge flow path 38 is diluted by a diluter 40 and then merged with an oxidizing off-gas in the exhaust flow path 23.

The controller 4 detects the manipulated variable of an accelerating member (such as an accelerator pedal) provided in the vehicle and controls the operations of various types of equipment in the system in response to control information, including a required acceleration value (e.g., a required power generation amount from a load device, such as the traction motor 12). The load device is used as a generic term of power consuming devices, such as auxiliary devices necessary to operate the fuel cell 10 (e.g., the motor of the compressor 24 and the motor of the hydrogen pump 39), the actuators used with various devices involved in the travel of the vehicle (a transmission, a wheel controller, a steering device, a suspension device, and the like), and air conditioning devices (air conditioners), lighting, audio, and the like in a crew space, in addition to the traction motor 12.

The controller 4 is constructed of a computer system, which is not shown. The computer system has a CPU, a ROM, a RAM, an HDD, I/O interfaces, a display, and the like. The CPU reads and executes various types of control programs recorded in the ROM to implement various types of control operations.

To be more specific, as illustrated in FIG. 2, the controller 4 calculates the amount of the hydrogen gas consumed by the fuel cell 10 (hereinafter referred to as "the hydrogen consumption amount") on the basis of the operating condition (the current value at the time of power generation by the fuel cell 10 detected by the current sensor 13) of the fuel cell 10 (fuel consumption amount calculating function: B1). In the present embodiment, a specific calculation equation indicating the relationship between the current value and the hydrogen consumption amount of the fuel cell 10 is used to calculate and update the hydrogen consumption amount at each calculation cycle of the controller 4.

Further, the controller 4 calculates the target pressure value of the hydrogen gas (the target pressure of the gas to be supplied to the fuel cell 10) at a position of the downstream of the injector 35 on the basis of the operating condition of the fuel cell 10 (the current value at the time of power generation by the fuel cell 10 detected by the current sensor 13) (a target pressure value calculating function: B2). In the present embodiment, a specific map indicating the relationship between the current values of the fuel cell 10 and target pressure values is used to calculate and update the target pressure value at the position where the secondary pressure sensor 43 is disposed at each calculation cycle of the controller 4.

Further, the controller 4 calculates a feedback correction flow rate on the basis of the difference between the calculated target pressure value and the pressure value (the detected pressure value) at the position on the downstream of the injector 35 detected by the secondary pressure sensor 43 (the feedback correction flow rate calculating function: B3). The feedback correction flow rate is the hydrogen gas flow rate to be added to the hydrogen consumption amount in order to reduce the difference between a target pressure value and a detected pressure value. In the present embodiment, a PI feedback control law is used to calculate and update the feedback correction flow rate at each calculation cycle of the controller 4.

Further, the controller 4 calculates the static flow rate of the upstream of injector 35 on the basis of the gas condition (the pressure of the hydrogen gas detected by the primary pressure sensor 41 and the temperature of the hydrogen gas detected by the temperature sensor 42) of the upstream of the injector 35 (the static flow rate calculating function: B4). In the present embodiment, a specific calculation equation indicating the relationship between the pressure and temperature of the hydrogen gas on the upstream side of the injector 35 and the static flow rate is used to calculate and update the static flow rate at each calculation cycle of the controller 4.

Further, the controller 4 calculates the invalid injection time of the injector 35 on the basis of the gas condition (the pressure and the temperature of the hydrogen gas) of the upstream of the injector 35 and an applied voltage (the invalid injection time calculating function: B5). Here, the invalid injection time means the time required from the instant the injector 35 receives a control signal from the controller 4 to the instant the injection is actually begun. In the present embodiment, a specific map indicating the relationship among the pressure and temperature of the hydrogen gas on the upstream side of the injector 35, applied voltages, and invalid injection time is used to calculate and update the invalid injection time at each calculation cycle of the controller 4.

Further, the controller 4 calculates the injection flow rate of the injector 35 by adding a hydrogen consumption amount and a feedback correction flow rate (the injection flow rate calculating function: B6). The controller 4 further calculates the drive cycle of the injector 35 on the basis of the injection flow rate of the injector 35 and the primary pressure value (the pressure of the hydrogen gas on the upstream side of the injector 35) detected by the primary pressure sensor 41 (the drive cycle calculating function: B7). Here, the drive cycle means a cycle T having a stepped (ON/OFF) waveform indicative of the opening/closing state of the injection hole of the injector 35, as indicated in FIG. 3A. In the present embodiment, a specific map indicating the relationship among the injection flow rate of the injector 35, the primary pressure value, and the drive cycle T is used to calculate and update the drive cycle T at each calculation cycle of the controller 4.

Further, the controller 4 sets an upper limit value $R_U$ of a duty ratio at each calculated drive cycle T (the ratio of valve-open time $T_{ON}$ in each drive cycle T) (the duty ratio limiting function: B8). At this time, the controller 4 sets the upper limit value $R_U$ of the duty ratio on the basis of a pressure recover time $T_S$ required from the instant of a command for closing the valve of the injector 35 to the instant the detected pressure value on the secondary pressure sensor 43 recovers to a specific representative pressure value $P_M$ (the pressure recover time $T_S$ being the value obtained by adding a valve closing delay time $T_V$ required from the instant of the command for closing the valve of the injector 35 to the instant the valve is actually closed and a response delay time $T_D$ of the secondary pressure sensor 43), as illustrated in FIG. 3B. To be more specific, the controller 4 smoothes a detected pressure value on the secondary pressure sensor 43 (by adopting, for example, a moving average) and forcibly ensures the value obtained by adding a filtering delay time $T_F$ required for the smoothing process and the pressure recover time $T_S$, as a valve closure time $T_{OFF}$ in each drive cycle T. The map given in FIG. 4 indicates the upper limit value $R_U$ of the duty ratio in each drive cycle T set as described above. The controller 4 functions as the control means in the present invention.

The controller 4 implements the detection of the pressure of the hydrogen gas by the secondary pressure sensor 43 after the elapse of certain time from the instant the valve of the injector 35 is closed. In other words, the controller 4 suspends the detection of the pressure of the hydrogen gas by the secondary pressure sensor 43 until at least the pressure recover time $T_S$ passes from the instant of the command for closing the valve of the injector 35, and then implements the pressure detection after the pressure recover time $T_S$ elapses. In such a manner, the controller 4 sets the upper limit value $R_U$ of the duty ratio in each drive cycle T and implements the detection of the pressure of the hydrogen gas by the secondary pressure sensor 43 after the certain time elapses from the instant the valve of the injector 35 is closed, thus making it possible to restrain the difference between the pressure value detected by the secondary pressure sensor 43 when the injector 35 is in operation and a target pressure value to a predetermined value or less.

Further, the controller 4 multiplies the value, which is obtained by dividing the injection flow rate of the injector 35 by the static flow rate, by the drive cycle T of the injector 35 (with the set upper limit value $R_U$ of the duty ratio) to calculate a basic injection time of the injector 35, and adds the basic injection time and invalid injection time to calculate the total injection time of the injector 35 (the total injection time calculating function: B9). Then, the controller 4 outputs a control signal for implementing the total injection time of the injector 35 calculated by the procedure described above thereby to control the gas injection time and the gas injection timing of the injector 35, thus adjusting the flow rate and the pressure of the hydrogen gas supplied to the fuel cell 10.

Referring now to the flowchart of FIG. 5, the operating method of the fuel cell system 1 according to the present embodiment will be described.

In a normal operation mode of the fuel cell system 1, the hydrogen gas is supplied to a fuel electrode of the fuel cell 10 through the hydrogen supply flow path 31 from the hydrogen tank 30, and the air with the humidity thereof adjusted is supplied to an oxidizing electrode of the fuel cell 10 through the air supply flow path 21, thereby generating electric power. At this time, the power to be derived from the fuel cell 10 (the required power) is calculated by the controller 4 and the hydrogen gas and air in the amounts based on the amount of electricity to be generated are supplied into the fuel cell 10. In the present embodiment, the pressure of the hydrogen gas supplied to the fuel cell 10 is controlled with high accuracy in the normal operation mode.

More specifically, first, the controller 4 of the fuel cell system 1 detects by using the current sensor 13 a current value at the time of power generation by the fuel cell 10 (a current detecting step: S1). Subsequently, the controller 4 calculates the amount of the hydrogen gas consumed by the fuel cell 10 (the hydrogen consumption amount) on the basis of the current value detected by the current sensor 13 (a fuel consumption amount calculating step: S2).

Subsequently, the controller 4 calculates the target pressure value of the hydrogen gas at a position on the downstream side of the injector 35 on the basis of the current value detected by the current sensor 13, and also detects the pressure value of the position on the downstream of the injector 35 by using the secondary pressure sensor 43. Then, the controller 4 calculates a feedback correction flow rate on the basis of the difference between the calculated target pressure value and the detected pressure value (a feedback correction flow rate calculating step: S3).

Subsequently, the controller 4 adds the hydrogen consumption amount calculated in the fuel consumption amount calculating step S2 and the feedback correction flow rate calculated in the feedback correction flow rate calculating step S3 so as to calculate the injection flow rate of the injector 35 (an injection flow rate calculating step: S4). The controller 4 further calculates the static flow rate of the upstream of the injector 35 on the basis of the pressure of the hydrogen gas on the upstream of the injector 35 detected by the primary pressure sensor 41 and the temperature of the hydrogen gas of the upstream of the injector 35 detected by the temperature sensor 42 (a static flow rate calculating step: S5).

Subsequently, the controller 4 calculates the drive cycle of the injector 35 on the basis of the injection flow rate of the injector 35 calculated in the injection flow rate calculating step S4 and the primary pressure value detected by the primary pressure sensor 41 (a drive cycle calculating step: S6). Then, the controller 4 sets the upper limit value of the duty ratio in each drive cycle calculated in the drive cycle calculating step S6 (a duty ratio limiting step: S7). Subsequently, the controller 4 calculates the basic injection time of the injector 35 by multiplying the value, which is obtained by dividing the injection flow rate of the injector 35 by the static flow rate, by the drive cycle of the injector 35 (with the set upper limit value of the duty ratio) (a basic injection time calculating step: S8).

Subsequently, the controller 4 calculates the invalid injection time of the injector 35 on the basis of the pressure of the hydrogen gas of the upstream of the injector 35 detected by the primary pressure sensor 41, the temperature of the hydrogen gas of the upstream of the injector 35 detected by the temperature sensor 42, and an applied voltage (an invalid injection time calculating step: S9). Then, the controller 4 adds the basic injection time of the injector 35 calculated in the basic injection time calculating step S8 and the invalid injection time calculated in the invalid injection time calculating step S9 thereby to calculate the total injection time of the injector 35 (a total injection time calculating step: S10).

Thereafter, the controller 4 outputs a control signal related to the total injection time of the injector 35 calculated in the total injection time calculating step S10 to control the gas injection time and the gas injection timing of the injector 35, thereby adjusting the flow rate and the pressure of the hydrogen gas to be supplied to the fuel cell 10.

In the fuel cell system 1 according to the embodiment described above, the duty ratio in each drive cycle of the injector 35 can be provided with an upper limit value (in other words, predetermined valve closure time can be forcibly ensured in each drive cycle of the injector 35). This makes it possible, therefore, to minimize the pressure detection error of the hydrogen gas attributable to an extremely short valve closure time of the injector 35. This in turn makes it possible to improve the accuracy of various types of control (e.g., the feedback control of the injector 35) based on the pressure detection results of the hydrogen gas.

In the embodiment described above, the example has been shown wherein, at the time of setting the upper limit value of the duty ratio in each drive cycle of the injector 35, the value obtained by adding the pressure recover time $T_S$ (the value obtained by adding the valve closing delay time required from the instant of the command for closing the valve of the injector 35 to the instant the valve is actually closed and the response delay time of the secondary pressure sensor 43) and the filtering delay time $T_F$ required for smoothing the pressure value detected by the secondary pressure sensor 43 is ensured as the valve closure time $T_{OFF}$ in each drive cycle T; however, the technique for setting the upper limit value of the duty ratio is not limited thereto. For example, in the case where the smoothing process is not carried out, it is possible to make the pressure recover time $T_S$ and the valve closure time $T_{OFF}$ coincide with each other.

Further, the embodiment described above has shown the example wherein, in order to minimize the error of a pressure detected by the secondary pressure sensor 43, the upper limit value of the duty ratio in each drive cycle of the injector 35 has been set according to the pressure recover time $T_S$ considering the response delay time of the secondary pressure sensor 43 and the filtering delay time. Alternatively, however, the upper limit value of the duty ratio may be set such that the error of a pressure detected by the primary pressure sensor 41 is minimized. At this time, preferably, the upper limit value of the duty ratio in each drive cycle of the injector 35 is set on the basis of the pressure recover time considering the response delay time of the primary pressure sensor 41 and the filtering delay time.

Further, the embodiment described above has shown the example in which the upper limit value of the duty ratio in the drive cycle of the injector 35 is set over the entire operation range. Alternatively, however, a set upper limit value of the duty ratio may be cleared in a specific operation range (e.g., a high-load operation range in which the injector pressurizable velocity at the time of limiting the duty ratio is expected to be lower than a desired pressure rising velocity).

Further, the embodiment described above has shown the example wherein the hydrogen gas piping system 3 of the fuel cell system 1 is provided with the circulation flow path 32.

Alternatively, however, the discharge flow path 38 may be directly connected to the fuel cell 10, thus omitting the circulation flow path 32. In the case where such a construction (a dead-end system) is adopted, the same operations and advantages as those of the above embodiment can be obtained by providing an upper limit value on the duty ratio in the drive cycle of the injector 35 in the same manner as that in the above embodiment by the controller 4.

The embodiment described above has shown the example wherein the circulation flow path 32 is provided with the hydrogen pump 39. Alternatively, however, an ejector may be adopted in place of the hydrogen pump 39. Further, the embodiment described above has shown the example in which the hydrogen supply flow path 31 is provided with the shutoff valve 33 and the regulator 34. Alternatively, however, it is not always necessary to provide the shutoff valve 33 and the regulator 34, because the injector 35 functions as a variable regulating valve and also functions as a shutoff valve for shutting off the supply of the hydrogen gas. Thus, adopting the injector 35 makes it possible to omit the shutoff valve 33 and the regulator 34, allowing the system to be smaller and less expensive.

Industrial Applicability

The fuel cell system according to the present invention can be mounted in a fuel cell vehicle, as shown in the above embodiment, and moreover, the fuel cell system can be installed also to a variety of mobile bodies (e.g., a robot, a ship, aircraft, and the like) in addition to a fuel cell vehicle. Furthermore, the fuel cell system in accordance with the present invention may be applied also to a fixed power generation system used as power generating equipment for a building (a house, a building, or the like).

BRIEF DESCRIPTION OF THE DRAWINGS

[FIG. 5] It is a flowchart for explaining an operating method of the fuel cell system illustrated in FIG. 1.

Explanation Of Reference Numerals

Figure 1:
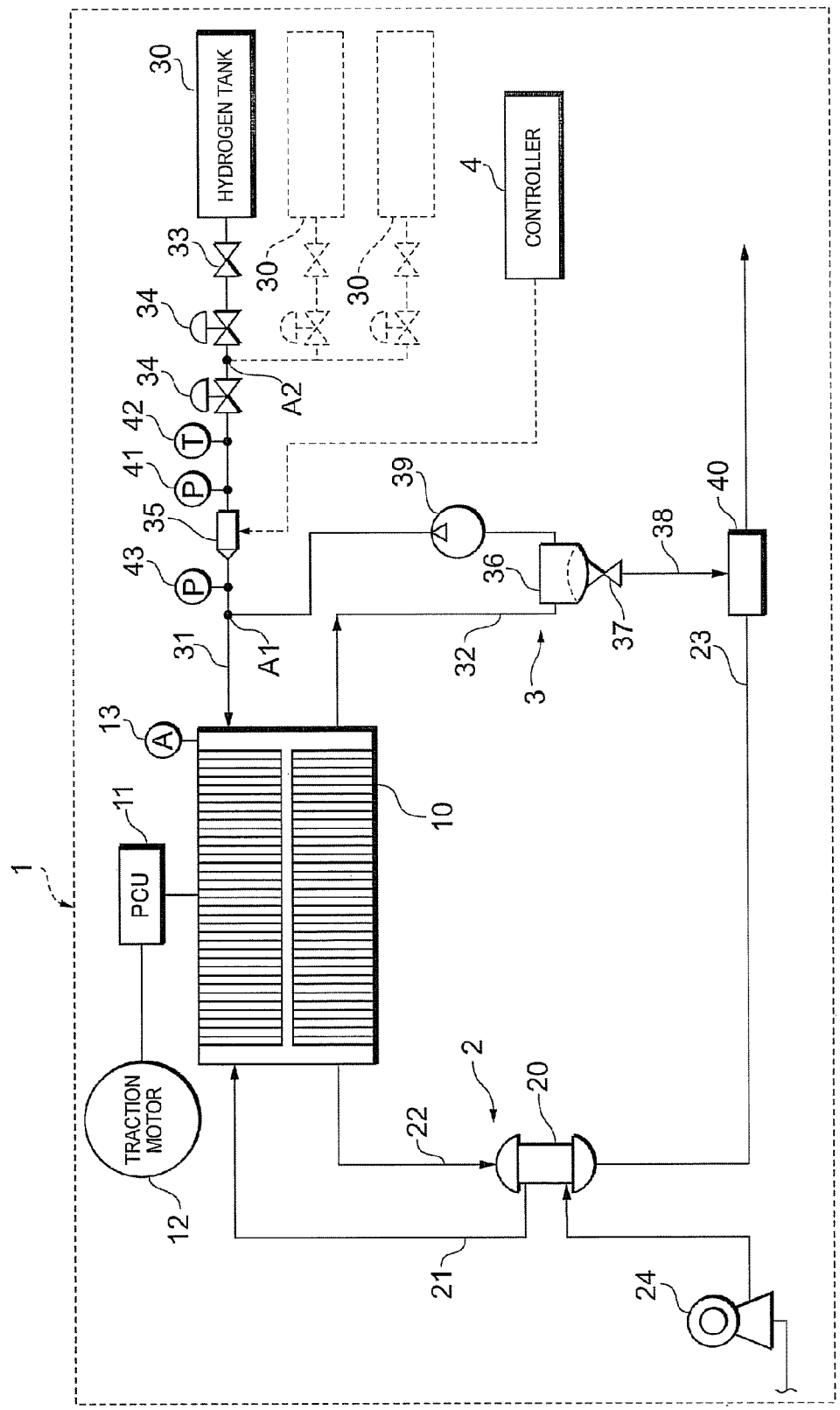
[FIG. 1] It is a block diagram of a fuel cell system according to an embodiment of the present invention.
Figure 2:
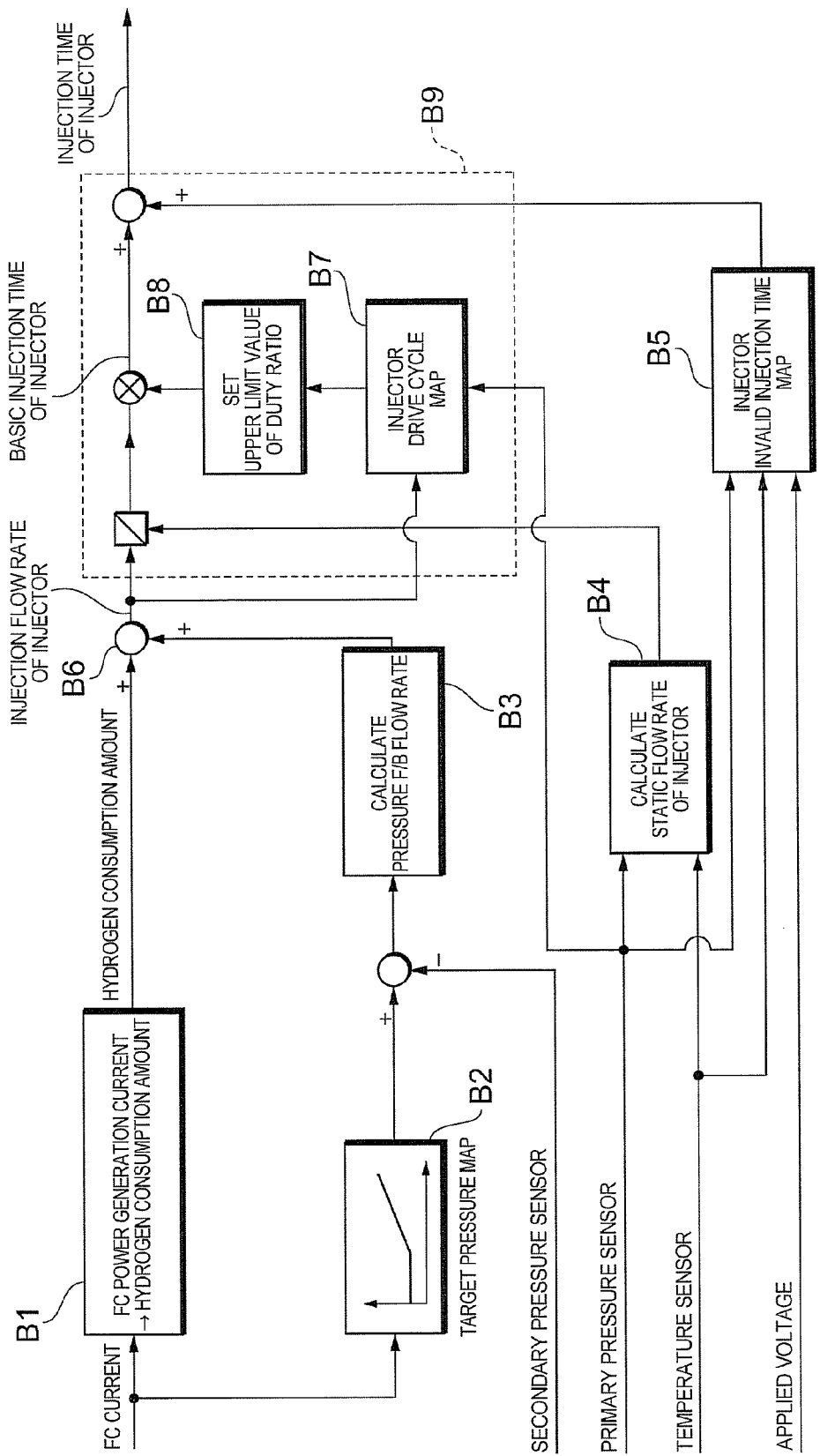
[FIG. 2] It is a control block diagram for explaining how a controller of the fuel cell system illustrated in FIG. 1 carries out control.
Figure 3A:
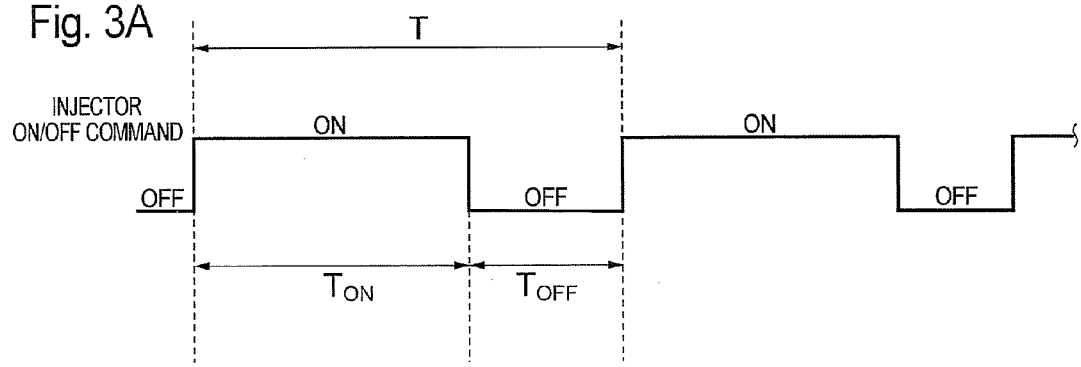
[FIG. 3A] It is a time chart of an ON/OFF command signal of an injector of the fuel cell system illustrated in FIG. 1.
Figure 3B:
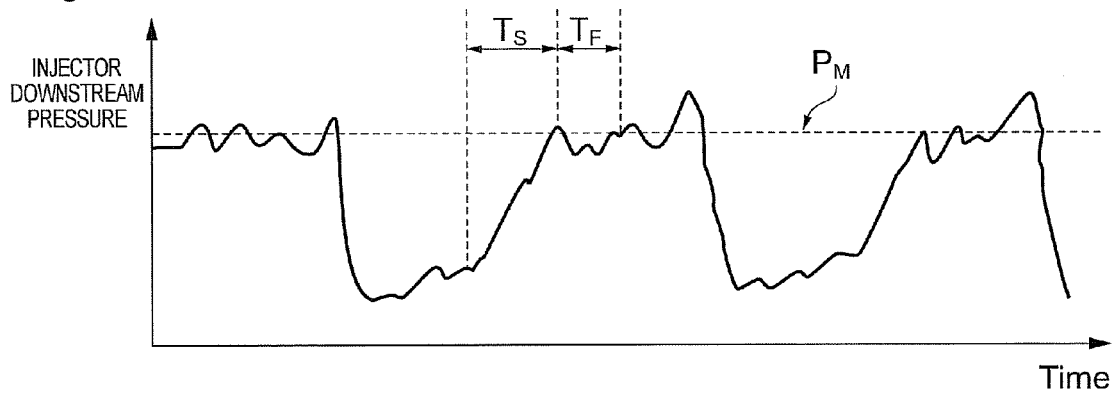
[FIG. 3B] It is a time chart of a detected pressure value on the downstream side of the injector of the fuel cell system illustrated in FIG. 1.
Figure 4:
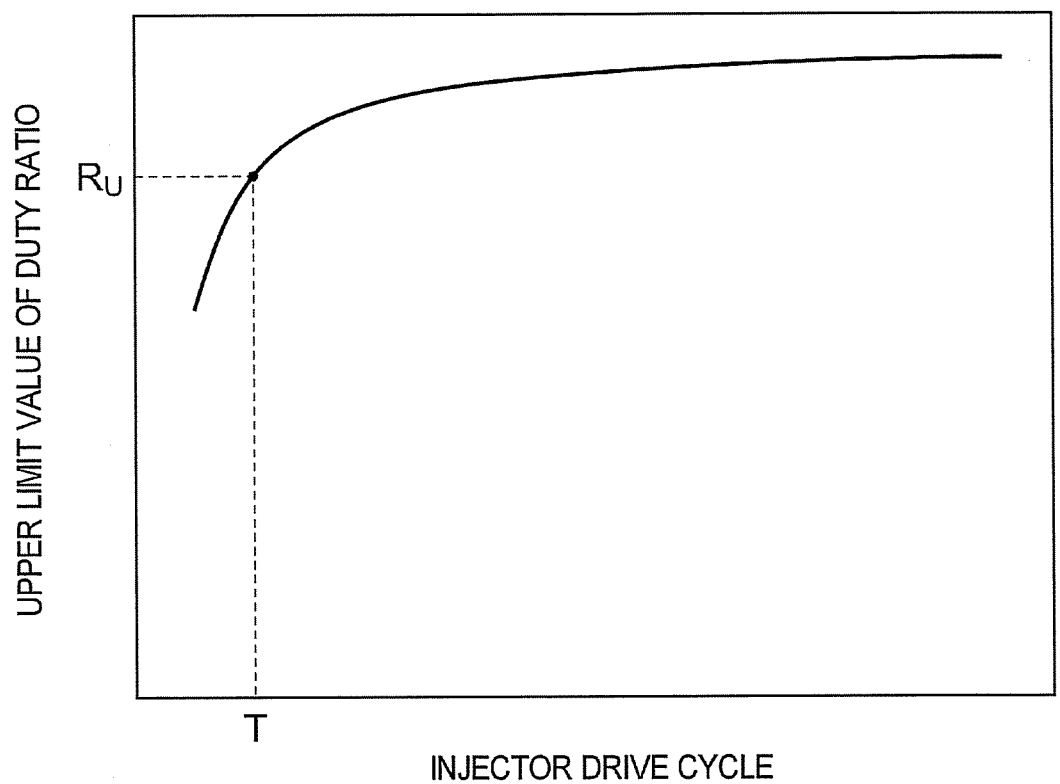
[FIG. 4] It is a map indicating the relationship between an injector drive cycle of the fuel cell system illustrated in FIG. 1 and a duty ratio upper limit value.

1 . . . Fuel cell system, 4 . . . Controller (Controlling means), 10 . . . Fuel cell, 30 . . . Hydrogen tank (fuel supply source), 31 . . . Hydrogen supply flow path (fuel supply flow path), 35 . . . Injector (on-off valve), 43 . . . Secondary pressure sensor

The invention claimed is:

1. A fuel cell system comprising:
a fuel cell;
a fuel supply flow path for supplying a fuel gas, which is supplied from a fuel supply source, to the fuel cell;
an on-off valve which adjusts the condition of a gas on an upstream side of the fuel supply flow path and supplies the gas to a downstream side;
a pressure sensor which detects the pressure value of a fuel gas on a downstream side of the on-off valve of the fuel supply flow path, and
a control device programmed to control the drive of the on-off valve at a predetermined drive cycle,
wherein the control device is further programmed to set an upper limit value of a duty ratio at each drive cycle of the on-off valve on the basis of pressure recover time required from the point of a valve close command of the on-off valve to the point at which a detected pressure value on the pressure sensor recovers.

2. The fuel cell system according to claim 1,
wherein the control device is further programmed to set the upper limit value such that the difference between a detected pressure value on the pressure sensor while the on-off valve is in operation and a target pressure value becomes a predetermined value or less.

3. The fuel cell system according to claim 1,
wherein the control device is further programmed to implement the pressure detection of the fuel gas by the pressure sensor after predetermined time elapses from the point when the on-off valve is closed.

4. The fuel cell system according to claim 1, wherein the on-off valve is an injector.

* * * * *

UNITED STATES PATENT AND TRADEMARK OFFICE
CERTIFICATE OF CORRECTION

PATENT NO. : 8,470,485 B2  Page 1 of 1
APPLICATION NO. : 12/743506
DATED : June 25, 2013
INVENTOR(S) : Norimasa Ishikawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 218 days.

Signed and Sealed this
Eighth Day of September, 2015

Michelle K. Lee
*Director of the United States Patent and Trademark Office*